United States Patent [19]

Ebner et al.

[11] 4,053,571

[45] Oct. 11, 1977

[54] PROCESS FOR PURIFYING LITHIUM HEXAFLUOROARSENATE

[75] Inventors: Walter B. Ebner, Hartsville; Charles Richard Walk, Collegeville, both of Pa.

[73] Assignee: The United States of America as represented by the Secretary of the Army, Washington, D.C.

[21] Appl. No.: 764,488

[22] Filed: Jan. 31, 1977

[51] Int. Cl.$^2$ .................... C01B 27/02; C01D 15/00
[52] U.S. Cl. ..................................... 423/464; 423/87
[58] Field of Search ................... 423/464, 488, 87

[56] References Cited

U.S. PATENT DOCUMENTS

| 3,655,332 | 4/1972 | Smith | 423/464 |
| 3,848,063 | 11/1974 | Cannon et al. | 423/464 |
| 3,907,977 | 9/1975 | Wiesboeck | 423/87 X |
| 3,925,539 | 12/1975 | Meshri et al. | 423/464 |

FOREIGN PATENT DOCUMENTS

| 2,111,036 | 9/1971 | Germany | 423/488 |

*Primary Examiner*—Edward Stern
*Attorney, Agent, or Firm*—Nathan Edelberg; A. Victor Erkkila; Harold H. Card, Jr.

[57] ABSTRACT

Lithium hexafluoroarsenate containing impurities, such as $LiAsF_5OH$ and HF, is purified by passing a solution of the impure product in an organic solvent, such as methyl formate, through a column of activated alumina which selectively adsorbs and removes such impurities.

5 Claims, No Drawings

PROCESS FOR PURIFYING LITHIUM HEXAFLUOROARSENATE

GOVERNMENT INTEREST

The invention described herein was made in the course of a contract with the Government.

BACKGROUND OF THE INVENTION

This invention relates to a process for purifying lithium hexafluoroarsenate ($LiAsF_6$) to produce a product of high purity suitable for use as an electrolyte in high energy density galvanic batteries.

The purification of $LiAsF_6$ by recrystallization from water is inefficient due to the high solubility of the $LiAsF_6$ in water, while purification by recrystallization from common organic solvents and mixtures thereof, e.g. acetone, dioxane, benzene, is ineffective. U.S. Pat. No. 3848063 discloses a multistep process for purifying $LiAsF_6$ to produce a product of high purity, which includes adding the impure $LiAsF_6$ to aqueous LiOH to cause decomposition and precipitation of impurities, adding further LiOH to maintain the pH at a minimum of 10.5 then adding HF to reduce the pH to 7.5–9.0, separating the precipitates from the $LiAsF_6$ solution, cooling the solution to precipitate the $LiAsF_6$ as trihydrate and dehydrating the product in vacuo. U.S. Pat. No. 3654330 also discloses a multistep process for producing a $LiAsF_6$ product of high purity, which comprises reacting impure $LiAsF_6$ with an excess of acetonitrile to produce the tetraacetonitrilolithium salt $Li(CH_3CN)_4AsF_6$, removing the excess acetonitrile, and heating the salt in vacuo to decompose the salt and remove the acetonitrile and thereby produce a $LiAsF_6$ of exceptionally high purity.

SUMMARY AND DETAILED DESCRIPTION OF THE INVENTION

A principal object of this invention is to provide a simple and economical process for purifying $LiAsF_6$ to produce a product of high purity.

In accordance with the process of the present invention, $LiAsF_6$ containing impurities, such as HF and lithium salts of $HAsF_5OH$ and other fluoroarsenate species, is purified by contacting a solution thereof in an organic solvent, such as methyl formate, with granular activated alumina, which selectively adsorbs and removes the impurities. The effluent solution of high purity $LiAsF_6$ obtained thereby is suitable for use as an electrolyte in high energy density batteries.

The process of the present invention comprises contacting, e.g. mixing, a liquid solution of lithium hexafluoroarsenate containing impurities, e.g. $LiAsF_5OH$ and HF, in an organic solvent with granular activated alumina, which selectively adsorbs and thereby removes such impurities, which are deleterious to the use of the electrolyte in batteries, and separating the solution of purified lithium hexafluoroarsenate from the activated alumina containing the adsorbed impurities.

The use of activated alumina according to the process of the present invention is effective for removing inorganic impurities of an acidic nature, which are often formed during the manufacture of lithium hexafluorarsenate or storage thereof, particularly if traces of moisture are present. Such acidic impurities include HF and $LiAsF_5OH$ as well as other fluoroarsenate species such as $LiASF_4(OH)_2$ and $LiAsF_3(OH)_3$. The presence of such acidic impurities can be demonstrated by potentiometric and pH measurements of solutions of the lithium hexafluoroarsenate in an organic solvent such as methyl formate. However, organic impurities of an acidic nature, if present, such as formic acid (which may be present in methyl formate solvent), cannot be satisfactorily removed by use of activated alumina under similar conditions.

In carrying out the process o the present invention, the impure lithium hexafluoroarsenate is dissolved in an inert organic solvent, preferably one containing not more than 200 ppm. of moisture. Suitable inert organic solvents for lithium hexafluoroarsenate are well known and include, for example, diethyl ether and particularly carboxylic acid esters of the formula RCOOR', wherein R and R' are alkyl groups containing one to four carbon atoms and R can also be hydrogen, e.g. methyl formate, ethyl formate, methyl acetate, ethyl acetate, butyl acetate, methyl proprionate, ethyl proprionate, ethyl butyrate and butyl butyrate. The impure lithium hexafluoroarsenate solution is contacted in the liquid state with the activated alumina preferably at a temperature within the range from 0° to 35° C. The degree of purification obtained depends largely on the purity of the $LiAsF_6$ starting material, the type and amount of activated alumina relative to the $LiAsF_6$ and the duration of contact of the $LiAsF_6$ solution with the activated alumina, and generally increases to a maximum as the amount of alumina and time of contact are increased. Neutral, basic and adsorption grades of alumina capable of removing acidic impurities can be effectively employed in the process of the present invention.

In a preferred embodiment of the process the $LiAsF_6$ solution is passed through a bed of the activated alumina at a rate sufficient to produce an effluent solution containing $LiAsF_6$ of the desired purity. Alernatively, if the effluent solution is of insufficient purity, it can be recycled until an effluent solution of the desired $LiAsF_6$ purity is obtained. Also, a small amount of activated carbon can be added to the activated alumina to remove the yellow coloration which is occasionally present in solutions prepared from $LiAsF_6$ obtained from some sources. The resulting solutions of purified $LiAsF_6$ can be utilized directly as electrolyte for batteries, or it can be flash distilled under high vacuum in known manner to remove the solvent and recover the $LiAsF_6$ product of high purity.

The following examples serve to illustrate specific embodiments of the method of carrying out the process of the present invention.

EXAMPLE 1

A chromatographic column 3.8 cm. dia. and 60cm. long was packed with 555 grams of granular activated alumina, obtained by heating at 230° C. adsorption grade alumina obtained from Fisher Scientific Co., and then flushed with 500–1000 ml of methyl formate.

500 ml of a two molar solution of $LiAsF_6$ in methyl formate was passed through the packed column at a rate of approximately 1 ml per minute at ambient temperature. The $LiAsF_6$/methyl formate solution was prepared by metathesis between approximately stoichiometric amounts of $LiBF_4$ and $KAsF_6$ in methyl formate solution according to the method described in U.S. Pat. No. 3,655,332, and contained impurities, notably $LiAsF_5OH$ and HF.

The $LiAsF_6$ solutions thus obtained before and after purification with activated alumina were analyzed by pH and potentiometric measurements as well as by gas chromatography. The test results set forth in the following table demonstrate that in comparison with the unpurified LIAsF$_6$ solution, the solution obtained by the purification with activated alumina possessed a much lower concentration of impurities, such as HF and LiAsF$_5$OH, as shown by the lower potentiometric and higher pH numbers. The fact that the potentiometric value was reduced from 692 mv to approximately 249 mv when the impure 2M LiAsF$_6$ solution was passed through the column of activated alumina shows that this treatment effectively removes impurities, e.g. HF and LIAsF$_5$OH, which give rise to high potentials (see examples 2 and 33).

| Test | Solution as Prepared | Solution after purification with activated alumina |
|---|---|---|
| Potentiometric Measurement [a] | 692 mv | 249 mv |
| pH [b] | 3.35 | 3.90 |
| Specific conductance [c] | 43.4 mmho/cm | 36.3 mmho/cm |

[a] The pH was measured immediately after mixing one part of the solution with nine parts of water.
[b] The potentiometric measurement was made of the potential between a platinum electrode and a standard saturated calomel electrode connected to the solution by a KCl-agar salt bridge, both electrodes being connected to a high impedance voltmeter (10$^{12}$ ohms or greater) equipped with a recorder. The electrodes were immersed in the test solution and the reading was taken 400 seconds after the immersion of the electrodes. (The reading should be relatively stable after 400 seconds, but if excessive drift still occurred after this period (>0.3 mv/sec) the measurement was considered void). The figures in the table are the average of five values obtained in this manner, using a fresh sample for each measurement. The platinum electrode was specially treated to have the required sensitivity in these measurements, as follows: The platinum electrode was cleaned in concentrated nitric acid and rinsed well with distilled water. The electrode was then immersed in a 1N solution of nitric acid and connected to the positive terminal of a constant potential power supply whose negative terminal was connected to a graphite rod electrode also immersed in said acid solution. The voltage was set at 2.0 volts and the power supply was activated for one minute, during which oxygen was freely evolved at the Pt electrode surface. The power supply was then turned off and the polarity of the electrodes was reversed. The power supply was reactivated for 20 to 90 minutes at a voltage of 2 volts (during this process hydrogen must be evolved at the surface of the Pt electrode throughout the entire cathodization process. Should hydrogen evolution cease, the process is repeated and, if the problem is not corrected, the electrode is deemed unsatisfactory and is replaced). The Pt electrode was then removed from the acid solution, rinsed well with distilled water and dried in a stream of cool air.
[c] The specific conductance measurements were made to monitor the LiSF$_6$ concentration of the effluent recovered from the alumina column.

The foregoing example demonstrates the effectiveness of activated alumina for removing acidic impurities, such as LiAsF$_5$OH and HF, from a solution of impure LiAsF$_6$ in methyl formate solution. The solution can be flash distilled in vacuo in known manner to remove the solvent and recover the purified LiAsF$_6$, or it can be employed directly as electrolyte solution in high energy density batteries.

EXAMPLE 2

The procedure of example 1 was repeated except that
a. a 2M LiAsF$_6$ solution in methyl formate was employed, wherein the LiAsF$_6$ was of extremely high purity obtained by the process of U.S. Pat. No. 3,654,330; and
b. Various amounts of LiAsF$_5$OH were added to the LiAsF$_6$ solution along with 2000 ppm of water to each solution to accelerate decomposition reactions. The results set forth in the following table show that the LiAsF$_5$OH impurity gives rise to high potentiometric values when tested in the manner described in example 1.

| LiAsF$_5$OH Concentration ppm | pH | Potential mv |
|---|---|---|
| 0 | 5.15 | 220 |
| 10 | 5.39 | 240 |
| 50 | 5.35 | 360 |
| 300 | 4.85 | 380 |
| 500 | 3.75 | 500 |
| 1000 | 3.69 | 480 |
| 5000 | 3.18 | 670 |

EXAMPLE 3

The procedure of example 2 was repeated except that HF was used in place of LiAsF$_5$OH. The results set forth in the following table demonstrate that the HF impurity gives rise to high potentiometric values

| Concentration of HF ppm | pH | Potential mv |
|---|---|---|
| 0 | 5.25 | 340 |
| 10 | 4.50 | 332 |
| 50 | 3.00 | 700 |
| 100 | 2.80 | 740 |
| 500 | 2.65 | 880 |
| 1000 | 2.45 | 910 |

The foregoing disclosure is merely illustrative of the principles of this invention and is not to be interpreted in a limiting sense. We wish it to be understood that we do not desire to be limited to the exact details of construction shown and described, because obvious modifications will occur to a person skilled in the art.

We claim:

1. A process for purifying lithium hexafluoroarsenate containing inorganic acidic impurities including LiAsF$_5$OH and HF, which comprises contacting a solution of the impure lithium hexafluoroarsenate in an inert organic solvent with activated alumina to effect removal of said inorganic acidic impurities including LiAsF$_5$OH and HF, and recovering the solution of purified lithium hexafluoroarsenate.

2. The process of claim 1, wherein the solvent is methyl formate.

3. The process of claim 1, wherein the lithium hexafluoroarsenate is obtained by a double decomposition reacton between approximately stoichiometric amounts of LiBF$_4$ and KAsF$_6$.

4. The process of claim 1, wherein the solution is passed through a bed of granular activated alumina.

5. The process of claim 1, wherein the solution of the impure lithium hexafluoroarsenate is contacted with the activated alumina at a temperature about from 0° to 35° C.

* * * * *